2,160,849

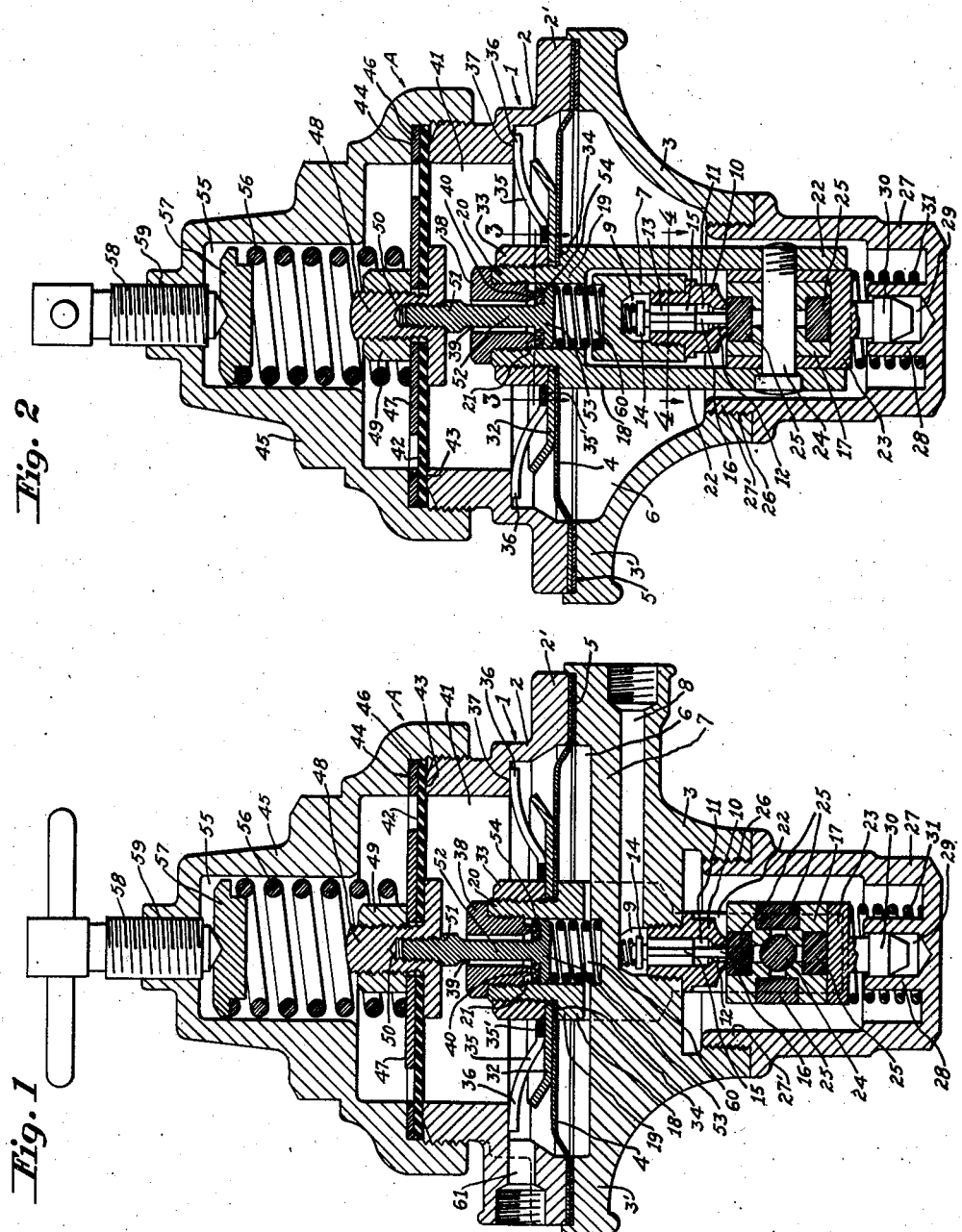

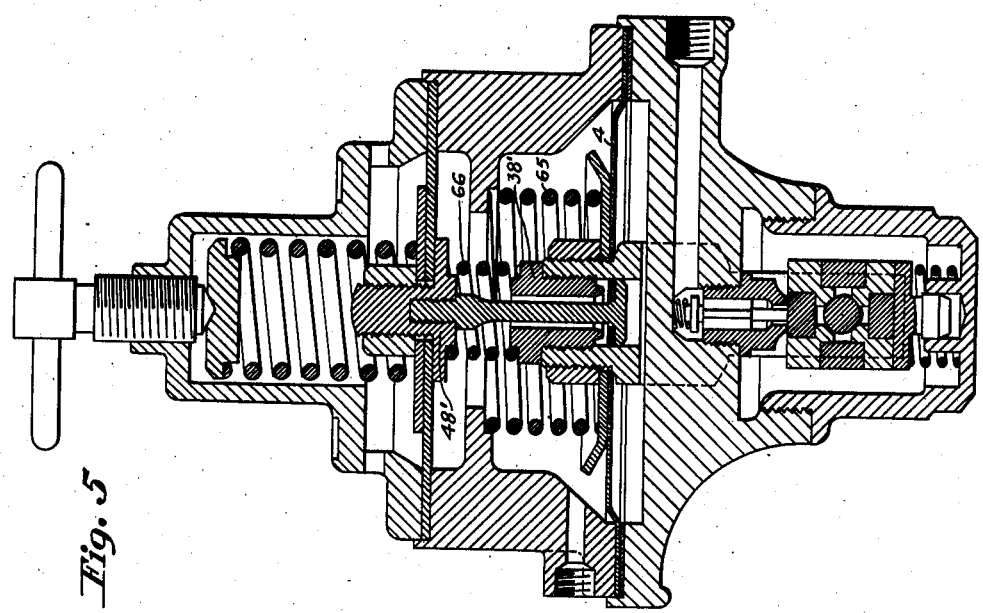
Fig. 5
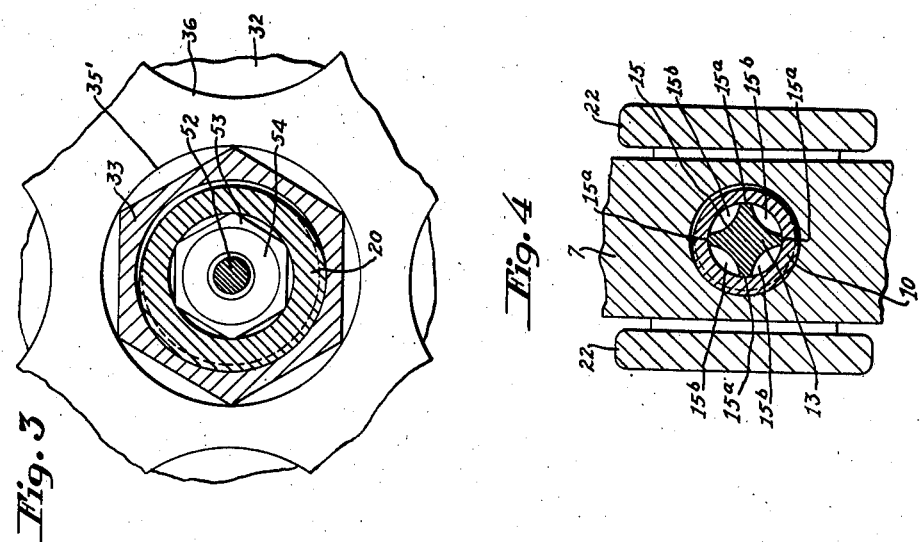
Fig. 3
Fig. 4
INVENTORS
ARTHUR J. FAUSEK
IRWING F. FAUSEK
BY
ATTORNEY Patented June 6, 1939

UNITED STATES PATENT OFFICE 2,160,849

MULTISTAGE PRESSURE REGULATOR

Arthur J. Fausek and Irwing F. Fausek, Clayton, Mo.

Application April 12, 1937, Serial No. 136,293

6 Claims. (Cl. 50—23)

This invention relates generally to pressure regulators, or reducing valves, and more specifically to apparatus of this type adapted for use in reducing the pressures of gases and other fluids, the predominant object of the invention being to provide a regulator, or reducing valve, which is of such improved construction and arrangement that the pressure of a gas or other fluid passing through the apparatus may be reduced by successive stages so as to reduce the gas from a relatively high pressure to a constant, non-fluctuating low working pressure such as is required for use in an oxy-acetylene cutting or welding torch.

As is generally well known by persons familiar with such matters gases employed in the operation of oxy-acetylene torches are contained in tanks under high pressure, usually 2000 lbs. per square inch, and said gases are delivered to the torches at a working pressure of from 1 to 150 lbs. per square inch. It has been found that when the pressures of gases employed in operating oxy-acetylene torches are reduced from their original high pressures to the very low working pressures required, in a single step, that unstable flames at the tips of the torches are frequently produced due to fluctuation of the working pressures of the gases delivered to the torches. By providing a regulator, or reducing valve in which the pressures of the gases are reduced in successive stages unstable flames at the tips of the torches are entirely eliminated and constant non-fluctuating flames are produced at the torch tips which greatly increase the efficiency of the torches and improve the work done therewith.

Fig. 1 is a vertical section taken through the improved regulator.

Fig. 2 is a view similar to Fig. 1 but taken at an approximate 90 degree angle with respect to Fig. 1.

Fig. 3 is an enlarged fragmentary cross-section taken on line 3—3 of Fig. 2.

Fig. 4 is an enlarged fragmentary cross-section taken on line 4—4 of Fig. 2.

Fig. 5 is a vertical section of a slightly modified form of the invention.

In the drawings, wherein are shown for the purpose of illustration, merely, two embodiments of the invention, A designates in Figs. 1 and 2, the improved regulator generally. The regulator A includes a body portion 1 which is comprised of cooperating sections 2 and 3, said sections being provided with annular flange portions 2' and 3' which are secured together by suitable fastening devices to provide the body portion of the regulator. Interposed between the flange portions of the sections 2 and 3 of the body portion 1 is the edge portion of a diaphragm 4 which is arranged within the interior of the body portion 1, a gasket 5 being associated with the edge portion of the diaphragm as shown in Figs. 1 and 2. The section 3 of the body portion is provided with an interior cavity which constitutes the high pressure chamber 6 of the regulator, the diaphragm 4 providing the top wall of said high pressure chamber. Extending transversely of the high pressure chamber 6 is a bridge portion 7 which is an integral part of the section 3 of the body portion of the regulator, said bridge portion being relatively narrow when compared with the diameter of the high pressure chamber as shown in Fig. 2, so that gas may flow upwardly around the opposite sides of the bridge portion.

Formed longitudinally in the bridge portion is an inlet passageway 8 which is enlarged and screwthreaded at its outer end to receive a connection (not shown). The inlet passageway at its inner end communicates with a cavity 9 which is formed vertically in the bridge portion at the approximate center thereof, and this cavity is screwthreaded through its lower portion so as to screwthreadedly receive a nozzle 10. The nozzle 10 includes an enlarged lower portion and a screwthreaded upper portion which is screwed into the screwthreaded lower portion of the cavity 9, and said nozzle is provided with an opening 11 formed therein which terminates at the bottom of the nozzle in a discharge aperture 12 of reduced diameter. Associated with the nozzle 10 is a check valve 13 which includes a valve head 14, a valve guiding portion 15 and a stem 16. The valve head, guiding portion, and stem of the check valve are of integral structure, the guiding portion being shaped in cross-section as shown in Fig. 4 so that the circumferentially spaced faces 15a thereof contact slidingly with the wall of the opening 11 of the nozzle to guide the check valve during movement thereof, and the openings 15b, intermediate the faces 15a, and between curved faces of the guiding portion and the wall of the opening 11 of the nozzle, provide passageways for gas moving through the opening 11 of the nozzle. As shown in Figs. 1 and 2 the stem 16 is of substantially less diameter than the discharge opening 12 of the nozzle through which said stem extends so that gas may pass through said discharge opening.

Arranged in cooperating relation with respect to the discharge end of the nozzle 10 is a closure element 17 which is supported by a yoke 18. The yoke 18 is provided with an upper bridge portion 19 which includes an upwardly projected, exteriorly screwthreaded extension 20, said extension 20 being provided with a vertical opening 21 formed therein the wall of which is screwthreaded at the upper end portion of said opening. Also the yoke 18 includes a pair of spaced legs 22 which extend downwardly from the bridge portion of the yoke. The closure element 17 is disposed within a U-shaped member 23, the spaced legs 22 of the yoke, the spaced upwardly extended legs of U-shaped member 23 and the closure element being provided with alined openings through which a fastening device 24 is extended as shown to the best advantage in Fig. 2. The closure element supports a plurality of seats 25 and when one of said seats which has been in the effective position becomes worn, or is broken or otherwise impaired the closure element and the associated U-shaped member may be removed from between the legs of the yoke 18, after which the closure element may be repositioned to locate another of the seats in the effective position, and the closure element and U-shaped member are replaced between the legs of the yoke.

The lower end portion of the section 3 of the body portion of the regulator A is provided with a screwthreaded opening 26 that receives the exteriorly screwthreaded upper portion 27' of a cap 27. The cap 27 encloses the lower portions of the spaced legs of the yoke, the closure element 17, and the U-shaped member 23, and said cap is provided with an upwardly projected extension 28 which has an opening 29 formed therein. The opening 29 referred to receives a downwardly extended element 30 which forms a part of the U-shaped member 23, said element 30 including a head which contacts with the wall of the opening 29 so as to guide the lower end portion of the yoke and the parts associated therewith when the yoke is subjected to vertical movement as will presently appear herein. The structure at the lower end of the yoke 18 includes a coilspring 31 which contacts at its opposite ends with the lower face of the U-shaped member 23 and the upper face of the bottom wall of the cap 27.

The diaphragm 4, heretofore referred to, is provided with a centrally located opening formed therein through which the screwthreaded extension 20 of the yoke 18 extends. Also the diaphragm 4 has associated with it a dish-shaped disk 32, said disk contacting with the top face of the diaphragm 4 and having a centrally located opening which is alined with the central opening of the diaphragm through which the extension 20 of the yoke extends. The yoke 18 is secured to the diaphragm 4 and to the disk 32 by a nut 33 which is screwed on the screwthreaded extension 20 of the yoke so as to clamp the diaphragm and the disk between the lower face of said nut and a shoulder 34 formed on the yoke. Additionally the diaphragm 4 and the disk 32 have associated with them a leaf spring 35 which contacts with the disk 32 and is provided with a centrally located opening 35' in which the lower portion of the nut 33 is located, and said leaf spring includes a plurality of outwardly extended, upwardly curved legs 36 which contact at their outer ends with a shoulder 37 forming a part of the section 2 of the body portion of the regulator. The leaf spring 35 tends to move the yoke 18 and the parts associated therewith in a downward direction.

Supported by the extension 20 of the yoke 18 is a nozzle 38 which includes a screwthreaded portion that is screwed into the screwthreaded upper portion of the opening 21 formed in said extension 20. The nozzle 38 is provided with an enlarged upper end the lower face of which contacts with the top face of the extension 20 and a passageway 39 is formed vertically through said nozzle, said nozzle being provided at its lower end with an annular projection 40. The space immediately above the diaphragm 4 constitutes the low pressure chamber 41 of the regulator and the top wall of this low pressure chamber is provided by a second diaphragm 42. The diaphragm 42 is secured in place by having its outer edge portion clamped between the top face 43 of the section 2 of the body portion of the regulator and a shoulder 44 which forms a part of a bonnet 45 that is screwed on the upper portion of said section 2 of the body portion of the regulator, a gasket 46 being interposed between said shoulder 44 and the top face of the diaphragm 42.

Arranged in contact with the top face of the diaphragm 42 is a disk 47, said disk and the diaphragm 42 being provided with alined centrally located apertures. Associated with the diaphragm 42 is a connecting member 48 which includes a screwthreaded shank portion that extends through the alined apertures of said diaphragm and the disk 47, said connecting member being provided also with a lower annular portion whose upper face contacts with the lower face of the diaphragm. The screwthreaded shank portion of the connecting member 48 has mounted thereon a nut 49 which is screwed downwardly on said shank portion so as to clamp the diaphragm 42 and the disk 47 to the connecting member 48. The connecting member 48 is provided with a screwthreaded opening 50 which receives the screwthreaded upper portion of a stem 51 forming a part of a closure element 52. The closure element 52 includes an enlarged, lower head portion 53 which is located in the opening 21 of the extension 20 of the yoke 18 and, as shown to the best advantage in Fig. 3, is noncircular when viewed in plan, the particular head 53 shown in Fig. 3 being provided with a plurality of flat faces between which flat faces and the wall of the opening 21 passageways are formed through which gas may pass. The stem 51 passes through the passageway 39 in the nozzle 38, said stem being of considerably less diameter than said passageway so that gas may pass through the passageway. The head 53 of the closure element has formed in its top face an annular depression in which an annular valve seat 54 is arranged, said valve seat being adapted, on vertical movement of the valve head 53, to move into and out of contact with the annular projection 40 formed at the lower end of the nozzle 38.

The bonnet 45 is provided with an opening 55 in which a coilspring 56 is disposed, said coilspring contacting at its upper end with a suitable spring seat 57 and at its lower end with the disk 47 associated with the diaphragm 42. In order to regulate the tension of the coilspring 56 a hand screw 58 is provided. This hand screw is screwthreadedly mounted in a screwthreaded opening 59 formed in the upper portion of the bonnet 45 and has a conical lower end portion which is disposed in a correspondingly shaped depression formed in the spring seat 57. Also a smaller coilspring 60 is arranged beneath the head 53 of the closure element 52, the upper end of said coilspring being in contact with the lower face of said head 53 and the lower end of said coilspring being seated in a depression formed in the bridge portion 7 of the regulator.

Communicating with the low pressure chamber 41 of the regulator is a gas discharge passageway 61 which, at its outer end is provided with an enlarged screwthreaded portion adapted to receive a suitable connection.

In the operation of the improved regulator, gas under high pressure enters the inlet passageway 8 and when the check valve 14 is unseated, or is raised upwardly from the top face of the nozzle 10, said gas passes downwardly of the nozzle 10 through the passageways 15b therein (see Fig. 4). When the closure element 17 is lowered so as to space the effective seat 25 of said closure element downwardly with respect to the lower discharge end of the nozzle 10 the gas passes through the discharge opening 12 of the nozzle 10 and is discharged into the high pressure chamber 6 of the regulator. The leaf spring 35 tends to move the diaphragm 4, yoke 18 and closure element 17 downwardly so as to remove the effective seat 25 of the closure element from the nozzle 10, and the gas pressure within the high pressure chamber 6 acting against the under side of the diaphragm 4 tends to move said diaphragm, said yoke and said closure element upwardly against the action of the spring so as to force the effective seat 25 of the closure element against the lower end of the nozzle 10. Thus the pressure of the spring 35 is opposed by the gas pressure acting against the under side of the diaphragm 4 and as a result of this situation the closure element moves toward and from the discharge end of the nozzle in response to these counteracting pressures so that pressure in the high pressure chamber 6 is maintained at a predetermined degree.

In like manner the downward pressure of the coil-spring 56 acting against the diaphragm 42 tends to move said diaphragm and the closure element 52, which is connected to said diaphragm, downwardly so as to move the seat 44 carried by the head 53 of the closure element away from the lower end of the nozzle 38. This permits gas to move from the high pressure chamber 6 past the noncircular head 53 of the closure element 52, through the passageway 39 in the nozzle 38 and into the low pressure chamber 41 wherein the gas pressure acts against the under side of the diaphragm 42 and thereby tends to move the closure element upwardly so as to force the seat 44 thereof against the lower end of the nozzle 38. Here again counteracting pressures are produced by the coilspring 56 and the gas pressure within the low pressure chamber 41 which causes the head of the closure element 52 to reciprocate toward and from the lower discharge end of the nozzle 38 whereby the pressure of gas in the low pressure chamber is maintained at a predetermined degree. From the low pressure chamber the gas therein passes through the discharge passageway 61 to a welding or cutting torch or other device with which the gas is used at a constant, non-fluctuating working pressure, which, in the use of the gas with a torch, produces the desired stable non-fluctuating flame at the tip of the torch.

The purpose of providing the regulator A with the check valve 13 is to prevent a sudden rush of high pressure fluid into the regulator at a time when the closure element 17 is spaced a considerable distance from the discharge end of the nozzle 10, or when the effective seat 25 of the closure element has been destroyed, for instance, such sudden rush of high pressure fluid into the regulator might rupture the diaphragm 4, or the effective seat 25 of the closure element 17 might be brought into contact with the discharge end of the nozzle with such sudden force as to fracture the breakable seat, or the high pressure fluid itself destroy the effective seat 25 of the closure element 17 because of the violence of its movement thereagainst. Also such high pressure might be built up within the body of the regulator as to cause an explosion within the regulator. The stem of the check valve 13 contacts with the effective seat 25 of the closure element, and because of the presence of the coilspring 13' which forces said stem against said effective seat 25 the check valve acts in consonance with the closure element in an opposite manner as the closure moves toward and from the lower discharge end of the nozzle 10. Thus the free passage of high pressure fluid from the nozzle 10 when the closure element 17 is spaced a considerable distance from the discharge end of the nozzle, or when the effective seat 25 of the closure element 17 has been destroyed, is prevented, and damage to the regulator caused by unrestricted discharge of high pressure fluid from the nozzle 10 is eliminated.

In Fig. 5 we illustrate a modified form of the invention which involves the use of a coilspring 65 for exerting downward pressure against the diaphragm 4 instead of the leaf spring shown in Figs. 1, 2, and 3. Also in this form of the invention the coilspring 60 shown in Figs. 1 and 2 is not employed but instead a coilspring 66 which performs the function of the coilspring 60 is interposed between the lower portion of the connector 48' and the upper portion of the nozzle 38'.

We claim:

1. A multi-stage pressure regulator comprising a body portion, a gas inlet leading into said body portion, means for controlling passage of gas from said gas inlet into a high pressure chamber formed in said body portion, said means including a diaphragm against which pressure is exerted by gas in said high pressure chamber to actuate said gas controlling means, a second gas controlling means for controlling passage of gas from said high pressure chamber to a low pressure chamber formed within said body portion, said second gas controlling means including a second diaphragm against which pressure is exerted by gas in said low pressure chamber to actuate said second gas controlling means, the first mentioned diaphragm serving as a dividing wall between the high and low pressure chambers, and a gas discharge passageway leading from said low pressure chamber.

2. A multi-stage pressure regulator comprising a body portion, a gas inlet leading into said body portion, means for controlling passage of gas from said gas inlet into a high pressure chamber formed in said body portion, said means including a diaphragm against which pressure is exerted by gas in said high pressure chamber to actuate said gas controlling means, a second gas controlling means for controlling passage of gas from said high pressure chamber to a low pressure chamber formed within said body portion, said second gas controlling means including a second diaphragm against which pressure is exerted by gas in said low pressure chamber to actuate said second gas controlling means, said first and second gas controlling means and the diaphragms thereof being alined with each other longitudinally of the body portion the first mentioned diaphragm serving as a dividing wall between the high and low pressure chambers, and a gas discharge passageway leading from said low pressure chamber.

3. A multi-stage pressure regulator comprising a body portion, a gas inlet leading into said body portion, means for controlling passage of gas from said gas inlet into a high pressure chamber formed in said body portion, said means including a diaphragm against which pressure is exerted by gas in said high pressure chamber to actuate said gas controlling means, a second gas controlling means for controlling passage of gas from said high pressure chamber to a low pressure chamber formed within said body portion, said second gas controlling means including a second diaphragm against which pressure is exerted by gas in said low pressure chamber to actuate said second gas controlling means, said first and second gas controlling means and the daiphragms thereof being alined with each other longitudinally of the body portion, said low pressure chamber being interposed between said first and second diaphragms with the first-mentioned diaphragm serving as a dividing wall between said high and low pressure chambers, and a gas discharge passageway leading from said low pressure chamber.

4. A multi-stage pressure regulator comprising a body portion, a gas inlet formed in said body portion, a gas outlet formed in said body portion, means for controlling passage of gas from said gas inlet into a high pressure chamber formed in said body portion, said means including a diaphragm, a closure element, an element with respect to which said closure element moves, and a member for connecting said closure element to said diaphragm, and a second gas controlling means for controlling passage of gas from said high pressure chamber to a low pressure chamber within said body portion, said second gas controlling means including a diaphragm, a closure element connected thereto, and an element supported by the connecting member of the first mentioned gas controlling means with respect to which the closure element of the second mentioned gas controlling means moves, said gas outlet being arranged in communication with said low pressure chamber.

5. A multi-stage pressure regulator comprising a body portion, a gas inlet formed in said body portion, a gas outlet formed in said body portion, means for controlling passage of gas from said gas inlet into a high pressure chamber formed in said body portion, said means including a diaphragm, a closure element, an element with respect to which said closure element moves, and a member for connecting said closure element to said diaphragm, and a second gas controlling means for controlling passage of gas from said high pressure chamber to a low pressure chamber within said body portion, said second gas controlling means including a diaphragm, a closure element connected thereto, and an element supported by the connecting member of the first mentioned gas controlling means with respect to which the closure element of the second mentioned gas controlling means moves, the last-mentioned element being provided with a gas passageway formed therethrough through which a portion of the closure element of the second-mentioned gas controlling means extends, said gas outlet being arranged in communication with said low pressure chamber.

6. A multi-stage pressure regulator comprising a body portion, a gas inlet formed in said body portion, a gas outlet formed in said body portion, means for controlling passage of gas from said gas inlet into a high pressure chamber formed in said body portion, said means including a diaphragm, a closure element, an element with respect to which said closure element moves, and a member for connecting said closure element to said diaphragm, and a second gas controlling means for controlling passage of gas from said high pressure chamber to a low pressure chamber within said body portion, said second gas controlling means including a diaphragm, a closure element connected thereto, and an element supported by the connecting member of the first mentioned gas controlling means with respect to which the closure element of the second mentioned gas controlling means moves, the last-mentioned element being provided with a gas passageway formed therethrough through which a portion of the closure element of the second-mentioned gas controlling means extends, and said closure element of said second-mentioned gas controlling element being provided with a head portion which is movable in an opening formed in said connecting member of the first-mentioned gas controlling means, said gas outlet being arranged in communication with said low pressure chamber.

ARTHUR J FAUSEK.
IRWING F. FAUSEK.